No. 746,360. PATENTED DEC. 8, 1903.
S. L. McADAMS.
COUPLING FOR AIR OR OTHER DUCTS.
APPLICATION FILED DEC. 21, 1898.
NO MODEL.
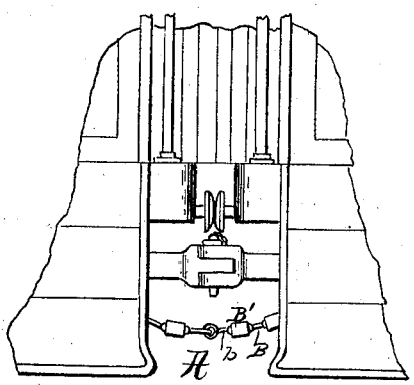
Fig. 8.
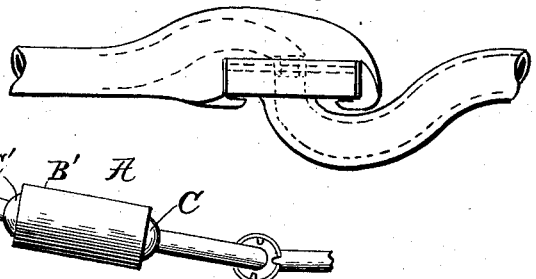
Fig. 6.
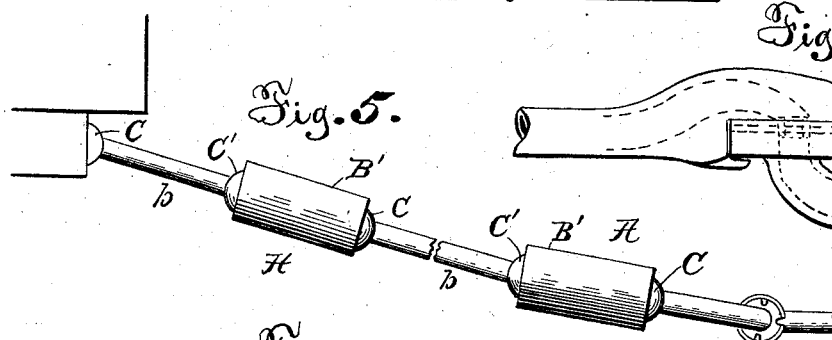
Fig. 5.
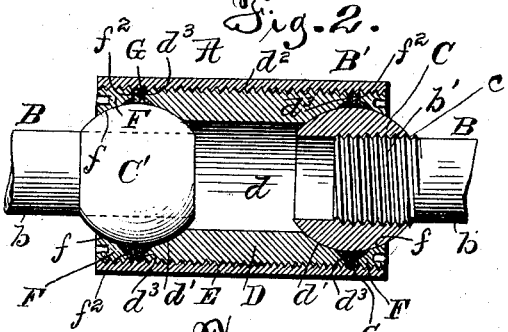
Fig. 2.
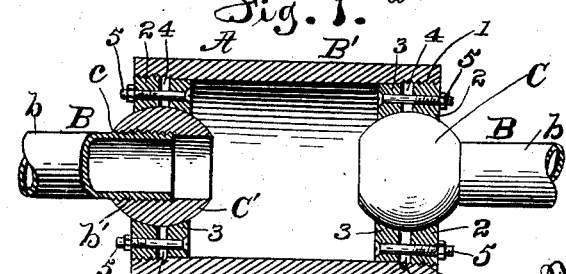
Fig. 1.
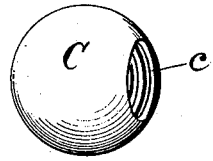
Fig. 4.
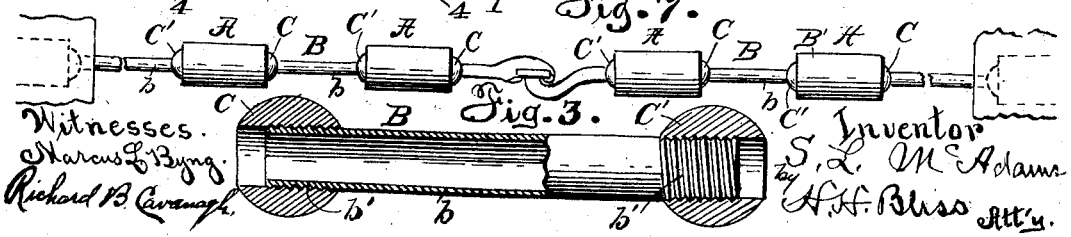
Fig. 7.
Fig. 3.
Witnesses.
Marcus L. Byng.
Richard B. Cavanagh.
Inventor
S. L. McAdams
by H. H. Bliss Att'y.
THE NORRIS PETERS CO., PHOTO-LITHO., WASHINGTON, D. C.

No. 746,360.

Patented December 8, 1903.

UNITED STATES PATENT OFFICE.

SYLVESTER L. McADAMS, OF BEAVERFALLS, PENNSYLVANIA, ASSIGNOR TO ALBERT R. MARTIN AND JOHN R. BOOK, OF BEAVERFALLS, PENNSYLVANIA, AND REINHOLD HERMAN, OF CRAFTON, PENNSYLVANIA.

COUPLING FOR AIR OR OTHER DUCTS.

SPECIFICATION forming part of Letters Patent No. 746,360, dated December 8, 1903.

Application filed December 21, 1898. Serial No. 699,893. (No model.)

*To all whom it may concern:*

Be it known that I, SYLVESTER L. MCADAMS, a citizen of the United States, residing at Beaverfalls, in the county of Beaver and State of Pennsylvania, have invented certain new and useful Improvements in Couplings for Air or other Ducts, of which the following is a specification, reference being had therein to the accompanying drawings.
Figure 1 is a longitudinal vertical section through the coupling-sleeve, showing one of the balls in side view and the other in central section with the coupling-pipe partly broken out. Fig. 2 is also a longitudinal section of the invention, showing the application of an exterior coupling-cylinder adapted to receive and hold the respective coupling elements. Fig. 3 is a detail view, partly in section, of the conduit-pipe with the balls attached thereto. Fig. 4 is a detail of one of the balls. Fig. 5 is a detail side view of two coupling elements coupled together and connected to a car and a well-known air-pipe coupler interposed at the other end of the illustration. Fig. 6 is a detail of a well-known pipe-coupler which may be used for uniting the pipe of the end element of my invention to the car-pipe. Fig. 7 is a detail side view showing the elements of my invention coupled in series and connected at the respective ends to bodies or cars provided with communicating pipes. Fig. 8 is a view in side elevation of the adjacent ends of cars coupled together by usual means and my invention applied thereto.

My improved coupling is particularly adapted for use in coupling or joining the stationary air-pipes secured to railway-cars and through which the air is transmitted by which the braking of the cars is accomplished; but I do not wish to be understood as limiting all of the features of construction to such use.

Heretofore employment has generally been made of rubber or flexible hose-sections for joining the air-duct of one car with that of another, the flexible portions of the hose being provided at the ends with metallic connecting devices of one character or another. One of the objects of the present invention is to provide an air-pipe connection which shall be throughout metallic in order that I may overcome the disadvantages and avoid the loss which has been incident to the flexible pipes or hose heretofore used.

My coupler can be regarded as made up of a series of elements which are duplicates of each other, each element having two parts, one being a short pipe or tube section with two balls, one ball at each end of the tube, and a relatively larger tubular device for connecting this element to an adjacent one.

I am aware that for some purposes use has been made of tube-sections in couplings, each tube being cast with an integral ball at one end or at each end; but I have found that tubes cast solid with balls are inferior in several respects. I aim to provide an easily-movable coupler whose parts shall be of great strength, but of as little weight as possible, and wherein the easily-breakable parts, such as the stem portions of the tubes, shall be of wrought metal, and therefore capable of standing vibrations, jars, and blows without danger of fracture.

A indicates one of the said elements as a whole, and as described it is composed of the relatively narrower tubular part B and of the relatively wider connecting or coupling part B'. The part B is constructed with a piece of drawn tubing $b$, which is made of a high grade of steel and possesses the capabilities above referred to not incident to castiron. This tube is threaded, as shown at $b'$, at each end.

C C' indicate steel balls which are provided with an axial aperture $c$ and are finished to have an exterior surface as accurately spherical as possible. The apertures $c$ $c$ are screwthreaded, so that the steel tube $b$ can be firmly connected thereto in the way shown. The steel tube $b$ and its balls C C' constitute the part B of one of the elements of the coupler.

In the form of construction as shown in Fig. 1 of the drawings the device comprises a cylindrical coupling-sleeve, coupling-rings, duplicate balls held in the coupling-rings, and pipes connected to the balls. The cylindrical coupling-sleeve B' is provided with interior screw-threads 1 1 at each end, extending a sufficient and proper distance within the cylinder. The coupling-rings comprise an outer ring 2, having exterior screw-threads to engage those of the cylinder, and an inner ring 3, having, preferably, a plane perimeter and snugly fitting in the plane bore of the cylinder, substantially as indicated. These rings are held in relation to each other with a space, as 4, between them and are formed with central openings having concaved edges adapted to accurately coincide with the spherical contour of the balls which are held in and carried by the rings. The rings are adjustable to and from each other by means of bolts 5 5, projected through them at proper points. The bolts adjust the rings to the balls and provide compensating means to take up the usual wear of the contacting surfaces. The balls C C' are seated in the concavity of the rings, and in the balls are passages, partly screw-threaded, in which the threaded ends of the pipes B engage.

The part B' may be formed with an interior body part D, (see Fig. 3,) which may be cast-iron, cast-steel, or other suitable metal. It is cylindrical upon its exterior surface. It has a relatively large axial duct or chamber $d$ and at each end is shaped to have at $d'$ a surface shaped to be a segment of the surface of a hollow sphere of a radius equal to that of the balls C C'. Its external surface $d^2$ is provided with a screw-thread running continuously from end to end.

E is a steel or other suitable jacket or sleeve fitted to the body or cylinder D and internally threaded to engage with the threads upon the outer surface of the latter. It extends some distance beyond the ends of the part D.

F F are retaining disks or rings. Each is formed with a concave surface at $f$, conforming to a part of the surface of a sphere of the radius of the balls C C', and the aperture through the outer or end face of each disk or ring is of a diameter somewhat less than that of the ball, but greater than that of the steel tube $b$. Each ring F has upon its periphery a screw-thread, whereby it can be engaged with the jacket or sleeve E and tightly fitted in place within the sleeve.

Annular surfaces $d^3$ and $f^2$ are provided on the ends of the part D and the inner faces of the parts F, respectively, and between the opposing faces $d^3$ and $f^2$ small packing-chambers are left, within which any suitable packing material can be placed and wherein it will be tightly clamped to insure an air-tight joint between the balls.

Of these elements A as many can be put together as are necessary for the purpose in hand. The terminal of the duct on each car is provided with one of the coupling-sections B' and therefrom may depend as many, as aforesaid, of the flexible elements as are necessary.

The manner of assembling or putting together the parts of each element and the elements themselves will be readily understood. The sleeve or jacket E is put in place upon the threaded body or cylinder D. Two of the rings or disks F are placed upon one of the steel tubes $d$. Then two of the balls C C' are screwed upon the ends of the latter. After that the ball C is placed against the spherical seat $d$ of one of the couplers, and the adjacent ring or disk F is tightly screwed into place, suitably compressing the packing at G, and the ball C' at the opposite end is similarly secured in the next adjacent coupler.

In the instance of the form of coupling shown in Fig. 1 the coupling-rings are placed on the ball, with the coupling duct-pipe screwed therein from opposite directions and then secured together by the fastening and adjusting bolts. These elements are then attached to the cylinder by slipping the rings into the cylinder until the threads of the outer ring engage those of the cylinder, when they are screwed home. By following this manner of construction I avoid having joints in the steel tubes $d$ and also avoid the presence of any parts which require expensive manipulation or machine-work.

Each form of the devices which I have selected for illustration is characterized by having in the coupler two interior bearing-bodies with concave surfaces bearing against the inner sides of the balls. In the construction shown in Fig. 1 these interior bearing-bodies are seen to be separate pieces of metal. In Fig. 3 the part D is to be regarded as two such bodies drawn together, and in Fig. 2 the interior metal mass is to be considered in the same way as having two parts at its ends, respectively, each constituting bearing-bodies for the balls.

It has been proposed heretofore to form ball-and-socket joints for tubular ducts by casting balls upon tubes and fitting them within spherical shells, the parts being so constructed and related that these spherical shells had to be divided into two or more parts, as well as the tubular stems. An illustration of this will be found in the Patent No. 205,069, to T. T. Farneswort; but in such constructions the bearing, wearing, abutment, or backing surfaces against the inner faces of the balls and those against their outer faces were not provided with means supplemental to the coupler and ball-holding parts for taking up their wear at their articulating-surfaces and for adjusting such surfaces relatively to each other from time to time.

In the present case all the parts can be rapidly and cheaply produced by simple machine-tools, and the mechanism of the whole is simple and can, as aforesaid, comprise drawn-steel tubing, with its well-known advantages.

There can be numerous variations in the construction made without departing from the essential features of the invention, provided that the characteristic parts be retained—as, for instance, two pipe-sections provided with balls, together with the coupler-section having inside of it an abutment or abutments to bear against the inner sides of the balls and rings, disks, or similar abutment devices on the outside of the balls. It is well known in the art that ball-joints can have the balls arranged to bear against either fixed abutments or yielding ones—as, for instance, against coiled springs—and this old device can be employed in the combination which I have devised, if desired, without departing from the principal features.

What I claim is—

1. A flexible metal train-pipe coupling, comprising a cylinder having interior screw-threads at each end, a pair of rings or disks in each end of the cylinder having central openings with concave surfaces, balls with central openings through them seated in the rings, means for moving the inner rings relative to the outer ones to adjust them to the balls, and detachable coupling-pipes in the balls, substantially as set forth.

2. A flexible metal train-pipe coupling comprising a cylinder having interior screw-threads at each end, rings in the ends of the cylinder having central openings with concave surfaces, balls, with central openings through them, seated in the rings, bolts through the rings to hold them in relation to each other and adjust them to the balls, and coupling-pipes screwed into the rings, substantially as set forth.

3. An air-duct comprising sections provided with balls, a coupler-section receiving the balls, means arranged at the ends of the coupler-section for engaging the balls and providing bearing-surfaces for the outer sides thereof, means within and detachable from the coupler-section and providing bearing-surfaces for the inner sides of the balls, and means for moving the last-described means relative to the first-described means to adjust their bearing-surfaces to the balls, substantially as set forth.

4. An air-duct comprising sections provided with balls, a coupler-section receiving the balls, rings or disks secured in the ends of the coupler-section and engaging the balls at the outer sides thereof, rings or disks detachable from the coupler-section and bearing against the inner sides of the balls, and means for moving the inner rings or disks relative to the outer ones to adjust their bearing-surfaces to the balls, substantially as set forth.

5. A duct for air or similar purposes comprising a pipe-section provided with a ball having a central opening therethrough, a coupler-section receiving the ball, means arranged at the end of the coupler-section for engaging the ball and providing an external bearing-surface therefor, means within the coupler-section adapted to move longitudinally therein and to provide an internal bearing-surface for the ball, and means for moving said last-described means to adjust its bearing-surface to the ball, substantially as set forth.

In testimony whereof I affix my signature in presence of two witnesses.

SYLVESTER L. McADAMS.

Witnesses:
S. W. ROUZER,
T. L POWELL.